United States Patent [19]

Natesh et al.

[11] Patent Number: 5,739,194
[45] Date of Patent: Apr. 14, 1998

[54] HUMIDITY RESISTANT AQUEOUS URETHANE/ACRYLIC RESINS AND COATING COMPOSITIONS

[75] Inventors: Anbazhagan Natesh, Marshall Township Allegheny County; Shanti Swarup, Hampton Township Allegheny County, both of Pa.; Mary Ellen Rosenberger, Bay Village; Mary Eifert, Lakewood, both of Ohio; Karl F. Schimmel, Verona Borough; John W. Burgman, McCandless Township, Allegheny County, both of Pa.

[73] Assignee: PPG Industries, Inc., Pittsburgh, Pa.

[21] Appl. No.: 668,069

[22] Filed: Jun. 24, 1996

[51] Int. Cl.$^6$ .................... C09D 151/08; C09D 175/04
[52] U.S. Cl. .................... 524/457; 524/507; 525/127; 525/454; 525/455
[58] Field of Search .................... 524/457, 507; 525/127, 454, 455

[56] References Cited

U.S. PATENT DOCUMENTS

| | | | |
|---|---|---|---|
| 3,684,758 | 8/1972 | Honig et al. | 260/29.6 |
| 3,705,164 | 12/1972 | Honig et al. | 260/29.6 |
| 4,198,330 | 4/1980 | Kaizerman et al. | 260/29.6 |
| 4,318,833 | 3/1982 | Guagliardo | 524/457 |
| 4,632,860 | 12/1986 | D'Antonio et al. | 428/290 |
| 4,644,030 | 2/1987 | Loewrigkeit et al. | 524/457 |
| 4,647,612 | 3/1987 | Ranka et al. | 524/458 |
| 4,791,168 | 12/1988 | Salatin et al. | 524/601 |
| 4,822,685 | 4/1989 | Perez et al. | 428/423.3 |
| 4,880,867 | 11/1989 | Gobel | 524/507 |
| 5,071,904 | 12/1991 | Martin et al. | 524/458 |
| 5,086,110 | 2/1992 | Xiao et al. | 524/840 |
| 5,118,752 | 6/1992 | Chang et al. | 524/521 |
| 5,137,961 | 8/1992 | Goos et al. | 524/457 |
| 5,173,526 | 12/1992 | Vijayendran et al. | 524/457 |
| 5,397,646 | 3/1995 | Nickle et al. | 428/423.1 |
| 5,470,907 | 11/1995 | Wallon et al. | 524/507 |

FOREIGN PATENT DOCUMENTS

| | | |
|---|---|---|
| 308 115 | 3/1989 | European Pat. Off. |
| 0 510 572 | 10/1992 | European Pat. Off. |
| 0 629 664 | 12/1994 | European Pat. Off. |

*Primary Examiner*—David Buttner
*Attorney, Agent, or Firm*—Dennis G. Millman; Kenneth J. Stachel

[57] ABSTRACT

Aqueous dispersions of urethane polymers and vinyl polymers (e.g., acrylics) are disclosed that provide water-based coating compositions with good adhesion following humidity exposure. The dispersion is predominately urethane, and the polyurethane is made from a first and a second polyisocyanate, the first polyisocyanate having at least one open carbon chain greater than six carbon atoms in length between two isocyanate groups, preferably at least eight carbon atoms in length. The vinyl monomers are polymerized in the presence of the aqueously dispersed polyurethane.

23 Claims, No Drawings

HUMIDITY RESISTANT AQUEOUS URETHANE/ACRYLIC RESINS AND COATING COMPOSITIONS

BACKGROUND OF THE INVENTION

The present invention relates to aqueous polymer dispersions comprising polyurethane and vinyl polymers useful in coating compositions.

It was known in the prior art to modify the properties of polyurethanes by incorporating vinyl polymers, particularly acrylic polymers, into a resin. One technique has been to form a water-dispersible polyurethane and then to polymerize vinyl monomers in the presence of the polyurethane as described in the patents cited below.

In producing water-based polyurethane/vinyl resins for use in coating compositions, it is desirable to achieve a combination of properties including gloss, flexibility, durability, abrasion resistance, and solvent resistance. A particular problem encountered with at least some water-based polyurethane/acrylate coating compositions has been a susceptibility to loss of adhesion when the cured coating is exposed to humid conditions. The following prior art attempts at producing water-based polyurethane/acrylates do not address the humidity resistance problem.

U.S. Pat. No. 3,705,164 (Honig et al.) discloses a process for making stable aqueous polymer dispersions by subjecting vinyl monomers to emulsion polymerization in the presence of a stable aqueous dispersion of a polyurethane containing anionic groups. The vinyl monomers disclosed include a variety of alkyl acrylates. Coatings are disclosed as a use of the resulting polymer dispersions.

U.S. Pat. No. 4,198,330 (Kaizerman et al.) discloses modifying an aqueous polyurethane by means of vinyl monomers by a process similar to that of the 3,705,164 patent. The vinyl monomers are selected from a particular group in order to yield a high glass transition temperature in the polymer.

U.S. Pat. No. 4,644,030 (Loewrigkeit et al.) discloses a method for making an aqueous dispersion of polyurethane by first producing an isocyanate-terminated polyurethane prepolymer in ethylenically unsaturated monomers such as acrylates. The polyurethane prepolymer is then dispersed in water and is chain-extended. Thereafter the unsaturated monomer material is polymerized in situ in the aqueous dispersion.

EP-A-0 308 115 discloses an aqueous polymer dispersion containing an anionic water-dispersible polyurethane and a vinyl polymer obtained by a process similar to that of the 4,644,030 patent.

U.S. Pat. No. 4,318,833 (Guagliardo) discloses a waterborne polyurethane/acrylate in which the acrylate portion is dominant.

U.S. Pat. No. 4,791,168 (Salatin et al.) relates to incorporating polyesters made from long-chain carboxylic acids into waterborne polyurethane resins.

U.S. Pat. No. 5,118,752 (Chang et al.) discloses aqueous polymerization of vinyl monomers, including acrylates, in the presence of a polymeric surfactant containing urethane groups and silane groups. Among the isocyanates used to make the urethane portion of the surfactant is included a hydrophobic isocyanate ("DDI" diisocyanate). A comparative example without silane groups is also disclosed, but is reported in the patent to perform poorly. All of the examples disclosed in the patent employ a substantially larger amount of vinyl polymer relative to the polyurethane polymer, and the vinyl portion is predominately styrene.

U.S. Pat. No. 5,173,526 (Vijayendran et al.) involves a method for making aqueous polyurethane/acrylates similar to Chang et al., except that no silane groups are included, no hydrophobic isocyanates are used, and the use of an oil-soluble initiator is required. The resulting aqueous polymer dispersion is intended for use in paper coatings.

Subject matter related to that of the present application is disclosed and claimed in co-pending, commonly owned U.S. patent application Ser. No. 08/668,901 titled "Aqueous Urethane Resins and Coating Compositions Having Enhanced Humidity Resistance" filed on even date herewith by Anbazhagan Natesh, Shanti Swarup, and Mary E. Rosenberger.

SUMMARY OF THE INVENTION

It has now been found that aqueous dispersions of urethane polymers and vinyl polymers such as acrylic polymers can be made that provide water-based coating compositions with good humidity resistance as well as a combination of performance properties required for commercial coating uses. As in some of the prior art patents discussed above, vinyl monomers are polymerized in the presence of a urethane that has been rendered water-dispersible. The resins of the present invention are predominately urethane; i.e., the polyurethane/vinyl polymer weight ration is at least 50 percent polyurethane, preferably greater than 55 percent polyurethane. Characterizing the polyurethane of the present invention is the selection of polyisocyanates from which it is synthesized. A first polyisocyanate is characterized by the presence of at least one open carbon chain greater than six carbon atoms in length between two isocyanate groups, preferably at least eight carbon atoms in length. For the sake of reduced cost and providing a range of coating properties, this first polyisocyanate may be combined with one or more different polyisocyanates selected from more conventional types used for coatings. Therefore, the first polyisocyanate preferably constitutes a minor portion of the polyisocyanate mixture, e.g., 20% to 50% by weight of the polyisocyanate mixture, although greater amounts are not precluded. The best resistance to water in the cured coatings have been found in embodiments in which the first polyisocyanate constituted at least 25% of the polyisocyanate mixture, preferably at least 30%.

The first polyisocyanate, at least one additional polyisocyanate, an active hydrogen containing compound (e.g., a polyol), and an isocyanate-reactive compound containing a salt-forming group are reacted to form a polyurethane prepolymer, which is then neutralized, dispersed in water, and chain-extended. The first polyisocyanate preferably constitutes at least about 10 weight percent of all the monomers used to make the polyurethane portion of the resin.

The aqueous polyurethane/vinyl polymer dispersions can be formulated into coating compositions that can be applied to metal substrates, as well as to temperature sensitive substrates such as plastics and wood because curing of the coating can take place at ambient temperatures. Optionally, thermally activated crosslinking agents may be included. The coatings have found utility in the original manufacture of automobiles, low temperature refinish coating of automobiles, and low temperature coating of plastic articles.

The coating composition of the present invention is particularly useful as a pigmented waterborne basecoat to which is applied a clear topcoat, such as a two-component isocyanate coating. When the clear top coat is based on organic solvent-borne resins, the susceptibility of a waterborne basecoat to deterioration due to humidity exposure is particularly critical, and the composition of the present invention is particularly adapted to resist such deterioration.

DETAILED DESCRIPTION OF THE INVENTION

The aqueous polyurethane/vinyl polymer dispersion of the present invention may be prepared by forming an isocyanate-terminated polyurethane prepolymer including ion-forming groups sufficient to permit dispersion of the prepolymer in water, adding a vinyl monomer mixture to the prepolymer to make a prepolymer/vinyl monomer mixture, adding a neutralizing agent to the prepolymer/monomer mixture to salify the ion-forming groups, dispersing the prepolymer/monomer mixture in water, adding a free radical initiator and a chain extender to the aqueous dispersion, and polymerizing the vinyl monomers and completing the chain extension of the polyurethane prepolymer by heating the aqueous dispersion.

The polyurethane prepolymers may be produced by reacting organic material containing an average of at least about two active hydrogen atoms per molecule (usually a diol, typically a polyester polyol) with a stoichiometric excess of a polyisocyanate mixture. Additionally, the reactants for forming the prepolymer include an additional monomer reactive with isocyanate and having a salt-forming group for providing water dispersibility to the prepolymer.

To attain the results of the present invention, it is important that the polyisocyanate prepolymer be made from at least one polyisocyanate having at least one open chain alkylene group greater than $C_6$ in length between isocyanate groups, preferably at least $C_8$ in length. This first isocyanate may additionally include aliphatic, cycloaliphatic, araliphatic or aromatic segments. It is believed that the presence of the alkylene group contributes to the improved humidity resistance exhibited by the coatings of the present invention. A particular type of polyisocyanate of this type that has been found suitable for use as the first polyisocyanate is characterized by the structure:

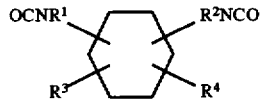

where $R^1$, $R^2$, $R^3$, and $R^4$ may be the same or different. $R^1$ and $R^2$ each contain alkylene groups at least $C_6$ in length (preferably at least $C_8$), and $R^3$ and $R^4$ each are H or an alkyl group. Preferably both of $R^3$ and $R^4$ are alkyl groups. In general, longer alkyl or alkylene groups provide greater hydrophobicity to the prepolymer, which is desirable. Although no upper limit has been identified, alkylene groups longer than $C_{20}$ are uncommon. An example of such a polyisocyanate is "DDI® 1410" diisocyanate available from the Henkel Corporation, which is 2-heptyl-3,4-bis(9-isocyanatononyl)-1-pentyl-cyclohexane.

Although polyisocyanates of the above-described first type may theoretically be used for the entire isocyanate content of the prepolymer, practical considerations such as cost generally limit them to no more than 50 percent by weight of the isocyanate monomer content. Providing a second polyisocyanate also permits additional attributes to be imparted to the product. In the particular embodiments tested, the advantages of the present invention were not perceptible when the first polyisocyanate was used in amounts less than about 20 percent by weight of the total polyisocyanate mixture. Significant improvements may be obtained when the first polyisocyanate constitutes at least 25 percent of the polyisocyanate mixture, and optimum results were obtained at levels of at least 30 percent. The remainder of the polyisocyanate mixture may constitute a second polyisocyanate of a more conventional type.

Polyisocyanates that may be used as the second polyisocyanate in making the prepolymer may be selected from a wide range of polyisocyanate compounds considered suitable for coating applications. These include aliphatic, cycloaliphatic, araliphatic or aromatic polyisocyanates. Examples of suitable polyisocyanates include ethylene diisocyanate, 1,6-hexamethylene diisocyanate, isophorone diisocyanate, cyclohexane-1,4-diisocyanate, 4,4'-dicyclohexylmethane diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenyl polyisocyanates and 1,5-naphthylene diisocyanate. The second isocyanate may also include mixtures of polyisocyanates.

The polyol component reacted with the polyisocyanates to form the polyurethane prepolymer may be members of any of the chemical classes of polymeric polyols used or proposed to be used in polyurethane formulations. Low molecular weight diols could possibly be used, but it is preferred to use polymeric polyols for at least a portion of the polyol component for the sake of flexibility in the coating. Polymeric polyols having molecular weights in the range of 200–6000 are typical. In particular, the polyols may be polyesters, polyesteramides, polyethers, polythioethers, polycarbonates, polyacetals, polyolefins or polysiloxanes. Polyester polyols are particularly preferred and include hydroxyl-terminated reaction products of polyhydric alcohols such as ethylene glycol, propylene glycol, diethylene glycol, neopentyl glycol, 1,4-butanediol, furan dimethanol, cyclohexane dimethanol, glycerol, trimethylolpropane or pentaerythritol, or mixtures thereof, with polycarboxylic acids, especially dicarboxylic acids or their ester-forming derivatives, for example succinic, glutaric, and adipic acids or their methyl esters, phthalic anhydride, or dimethyl terephthalate. Polyesters obtained by the polymerization of lactones, for example caprolactone, in conjunction with the polyol may also be used. Polyesteramides may be obtained by the inclusion of amino-alcohols such as ethanolamine in the polyesterification mixtures.

To provide for water dispersibility, the monomer mixture used to produce the polyurethane prepolymer may include isocyanate-reactive compounds containing salt forming groups. Most conveniently, the polymer is made anionic, whereby the salt-forming group may be a carboxylic acid group which can subsequently be neutralized to salt form. In that case, the monomer can be a polyol having a carboxylic acid group. These include carboxy group containing diols and triols, for example dihydroxyalkanoic acids of the formula

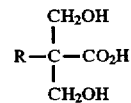

wherein R is hydrogen or a $C_1$–$C_{10}$ alkyl group. Specific examples of isocyanate-reactive acids include 2,2-di(hydroxymethyl)acetic acid, 2,2,2-tri(hydroxymethyl)acetic acid, 2,2-di(hydroxymethyl)butyric acid, 2,2-di(hydroxymethyl)pentanoic acid, and the like. The preferred carboxy-containing diol is 2,2-di(hydroxymethyl)propionic acid. If desired, the carboxy-containing diol or triol may be incorporated into a polyester by reaction with a dicarboxylic acid before being incorporated into the prepolymer. The concentration of salt-forming groups is chosen so as to provide stability to the aqueous dispersion of the prepolymer in water. This will vary in accordance with the hydrophobicity of the particular polymer. For the best results, the acid number for the final polyurethane/acrylic dispersion may be in the range of 1 to 125 milligrams KOH per gram of polymer solids, preferably 20 to 100.

The anionic, water-dispersible, isocyanate-terminated polyurethane prepolymer may be prepared in conventional manner by reacting a stoichiometric excess of the polyisocyanates with the polymeric polyols under substantially anhydrous conditions at a temperature between about 30° C. and 130° C. until the reaction between the isocyanate groups and the hydroxyl groups is substantially complete. The polyisocyanate and the polyol components are suitably reacted in such proportions that the ratio of number of isocyanate groups to the number of hydroxyl groups is in the range from about 1.1:1 to about 6:1, preferably within the range of from 1.5:1 to 3:1. If desired, the well-known tin catalysts may be used to assist prepolymer formation.

A method for polymerizing the vinyl monomers involves adding the vinyl monomers to the previously formed polyurethane prepolymer, neutralizing the prepolymer, and then dispersing the prepolymer/monomer mixture in water. Polyurethane chain extender may be added at this time also. Thereafter, vinyl polymerization initiator is added and the temperature is increased to effect polymerization of the vinyl monomers.

A mixture of the water-dispersible polyurethane prepolymer and vinyl monomers is produced by adding a vinyl monomer composition to the prepolymer. Suitable vinyl monomers which may be combined with the prepolymer include ethylenically unsaturated hydrocarbons, esters and ethers, especially esters of acrylic and methacrylic acids. Specific examples include butadiene, isoprene, styrene, substituted styrenes, the lower alkyl ($C_1$–$C_6$) esters of acrylic, methacrylic and maleic acids, vinyl acetate, vinyl butyrate, acrylonitrile, vinylmethyl ether, vinylpropyl ether, vinylbutyl ether, vinyl chloride, vinylidene chloride, and the like. Polyethylenically unsaturated monomers include butadiene, isoprene, allylmethacrylate, diacrylate esters of $C_2$–$C_6$ diols such as butanediol diacrylate and hexanediol diacrylate, divinyl benzene, divinyl ether, divinyl sulfide, trimethylolpropane triacrylate and the like. The esters of acrylic and methacrylic acid are preferred, constituting at least 70 percent by weight of the vinyl monomer mixture in preferred embodiments, preferably at least 95 percent. It has been found that only limited amounts of styrene (including substituted styrenes) may be included in the vinyl monomer mixture. It is believed that this is due to the hydrophobic nature of styrene. Therefore, the styrene content of the vinyl monomer mixture is generally less than 50 weight percent, preferably less than 30 weight percent. Specific embodiments contain no styrene. On the other hand, it has been found to be desirable to include a relatively hydrophilic vinyl monomer in the vinyl monomer mixture, such as methyl methacrylate. In the most preferred embodiments of the invention, at least 50 weight percent of the vinyl monomer mixture constitutes methyl methacrylate.

Before the prepolymer/monomer mixture is dispersed in water, ammonia or a water soluble or dispersible amine is added to the mixture in an mount sufficient to substantially neutralize the carboxylic functionality as is well known in the art. The amine is added at about 65 to 120% amine equivalent per equivalent of carboxy functionality, preferably about 80% to 100%. Amines that may be used for neutralization are relatively volatile so that they may evaporate from the coating upon curing. Ammonia, or primary, secondary, or tertiary aliphatic, alicyclic, aromatic, araliphatic or heterocyclic amines may be used. Amines with hydroxy substituted alkyl groups may also be suitable. Examples of amines include diethylamine, diethanolamine, diisopropanolamine, 2-methyl-2-aminopropanol, triethylamine, dimethylethanolamine, methyldiethanolamine, and methyldiethylamine. The prepolymer/vinyl monomer mixture may be dispersed in water using techniques well known in the art. Preferably, the mixture is added to the water with agitation, or, alternatively, water may be stirred into the mixture.

The polyurethane prepolymer is preferably chain extended by addition of an active hydrogen-containing compound to the aqueous system. The chain extender may be a polyol, an amino alcohol, ammonia, or a primary or a secondary aliphatic, alicyclic, aromatic, araliphatic or heterocyclic amine, especially a diamine. Examples of suitable chain extenders include ethylenediamine, diethylene triamine, triethylene tetramine, propylene diamine, butylene diamine, pentane diamine, hexamethylene diamine, cyclohexylene diamine, piperazine, 2-methyl piperazine, phenylene diamine, toluene diamine, tris(2-aminoethyl)amine, 4,4'-methylenebis(2-chloraniline), 3,3'-dichloro-4,4'-diphenyl diamine, 2,6-diaminopyridine, 4,4'-diaminodiphenyl methane, isopherone diamine, and adducts of diethylenetriamine with acrylate or its hydrolyzed products. Also suitable are amines as above having substitutions in the alkyl groups.

The amount of chain extender employed should be approximately equivalent to the free isocyanate groups in the prepolymer, the ratio of active hydrogens in the chain extender to isocyanate groups in the prepolymer preferably being in the range from 0.7 to 1.3:1. Of course when water is employed as the chain extender, these ratios will not be applicable since the water, functioning as both a chain extender and dispersing medium, will be present in a gross excess relative to the free isocyanate groups.

Free radical initiators that may be used for polymerization of the vinyl monomer component include: ammonium persulfate, hydrogen peroxide, t-butyl hydrogen peroxide, and other water-soluble initiators as are known in the art, particularly the azo-type initiators sold under the name VAZO by E. I. DuPont de Nemours & Co.

The chain extending reaction begins to proceed upon addition of the chain extender to the aqueous dispersion. Free radical polymerization of the monomer mixture begins when the temperature is elevated to a temperature sufficient to liberate free radicals at a rate that sustains the polymerization reaction. A typical temperature range is 30°–90° C., depending upon the particular reactants chosen.

The polymer dispersions obtained typically comprise 20 to 60 weight percent solids and may be employed as coating compositions and applied to any substrate including metals, plastics glass, wood, cloth, leather, paper, foam and the like by any conventional method including brushing, dipping, flow coating, spraying and the like. Generally, a coating of the aqueous composition is dried and cured at temperatures ranging from ambient to 150° C. for times ranging from 24 hours to 30 minutes. It is an advantage of the present invention that a cured coating can be Obtained at relatively low temperature since no thermally activated crosslinking is required. This is advantageous for use on plastics and for refinish coating of automobiles. Alternatively, any of the thermally activated crosslinking agents commonly used for coatings, such as the many commercially available aminoplast resins (e.g., alkoxylated malamine derivatives) may be included in the coating compositions. These coating compositions of the present invention that include a crosslinking agent may be cured at elevated temperatures. Embodiments that include crosslinking agents are preferred for original automobile manufacturing applications. Other crosslinking mechanisms, such as the silane functionality required by U.S. Pat. No. 5,118,752 (Chang et al.), are not required in the present invention, and are preferably avoided in order to obtain the humidity resistance found in the coatings of the present invention. Accordingly, the polyurethane polymer of the present invention is preferably substantially free of silane groups.

EXAMPLE 1

An aqueous polyurethane/acrylic polymer dispersion in accordance with the present invention was made using the ingredients as follows:

| Feed Ingredient | Parts by weight |
|---|---|
| 1. Methylene dicyclohexyl diisocyanate[1] | 183.5 |
| 2. DDI ® 1410 diisocyanate[2] | 106.5 |
| 3. FORMREZ ® 66–56[3] | 295.0 |
| 4. Dibutyltin dilaurate | 0.5 |
| 5. Dimethylol propionic acid | 45.6 |
| 6. Methyl ethyl ketone | 143.6 |
| 7. Methyl methacrylate | 246.0 |
| 8. Butyl acrylate | 188.7 |
| 9. Dimethylethanol amine | 30.3 |
| 10. Ethylene diamine | 21.3 |
| 11. Deionized water | 1625.0 |
| 12. Ferrous ammonium sulfate (1% aqueous solution) | 1.5 |
| 13. Isoascorbic acid | 1.0 |
| 14. Hydrogen peroxide (35% aqueous solution) | 1.5 |
| 15. Deionized water | 87.5 |

[1]DESMODUR ® W from Bayer Corp., Pittsburgh, Pennsylvania.
[2]2-heptyl-3,4-bis(9-isocyanato nonyl)-1-pentyl-cyclohexane from Henkel Corporation.
[3]Poly(1,6-hexanediol adipate), molecular weight about 2000, from Witco Corporation.

Into a clean dry reactor equipped with heating, cooling, stirring and a nitrogen blanket were charged feeds 1 to 6. The reaction mixture was heated to 70° C. and held at this temperature for 2 hours. After this hold, feeds 7, 8, and 9 were added to the reaction product while cooling the reactor to 35° C. The prepolymer/monomer mixture was then transferred into another reactor containing feeds 10 and 11. The resulting dispersion was heated to 40° C., followed by the addition of feeds 12, 13, 14, and 15. The solution exothermed to about 60° C. The product thus formed had the following physical properties: total solids of about 35%, pH of about 8.1, viscosity of about 100 centipoise.

COATING EXAMPLE A-1 (Comparative)

For comparison purposes, a pigmented base coat composition was made as follows, using a commercially available aqueous acrylic resin (RHOPLEX® WL-96) instead of the polyurethane/acrylic dispersion of the present invention.

| Ingredients | Parts by Weight |
|---|---|
| RHOPLEX ® WL-96[1] | 192.44 |
| BENTONE ® EW[2] (1.9% by wt. aqueous dispersion) | 25.44 |
| Butyl CELLOSOLVE ®[3] | 4.74 |
| Polypropylene glycol[4] | 4.74 |
| Butyl benzylphthalate | 9.49 |
| NOPCO DSX ® 1550[5] (10% by wt. aqueous solution) | 13.98 |
| SURFYNOL ® 104DPM[6] | 2.20 |
| Waterborne acrylic black tint[7] | 7.60 |
| Waterborne acrylic blue tint[8] | 76.87 |

[1]Aqueous acrylic emulsion from Rohm and Haas Company, Philadelphia, Pennsylvania.
[2]Organo clay rheological additive from Rheox, Inc., Hightstown, New Jersey.
[3]Ethylene glycol monobutyl ether solvent from Union Carbide Chemicals and Plastics Company, Inc., Danbury, Connecticut.
[4]Molecular weight approximately 425, from Arco Chemicals.
[5]Urethane associative thickener from Henkel Corporation, Kankakee, Illinois.
[6]Surfactant from Air Products and Chemicals, Inc., Allentown, Pennsylvania.
[7]A dispersion of carbon black pigment in an aqueous acrylic vehicle.
[8]A dispersion of phthalo blue pigment in an aqueous acrylic vehicle.

The coating composition of Example A-1 was prepared by slowly adding each of the materials in sequence to a mixing vessel under moderate agitation with a paddle blade, with 5 minutes of mixing between additions.

COATING EXAMPLE A-2 (Comparative)

For comparison purposes, a pearlescent intermediate coating composition was made as follows, using a commercially available aqueous acrylic resin (RHOPLEX® WL-96) instead of the polyurethane/acrylic dispersion of the present invention.

| Ingredients | Parts by Weight |
|---|---|
| Deionized water | 85.47 |
| LAPONITE ™ RD[1] | 0.85 |
| Deionized water | 62.14 |
| BENTONE ® EW | 2.05 |
| RHOPLEX ® WL-96 | 208.16 |
| Butyl CELLOSOLVE ® | 7.52 |
| Butyl CARBITOL ®[2] | 2.51 |
| Butyl benzylphthalate | 10.32 |
| NOPCO DSX ® 1550 (10% by wt. aqueous solution) | 50.80 |
| Amino methyl propanol (50% by wt. aqueous solution) | 0.97 |
| SURFYNOL ® DF210[3] | 0.19 |
| Pearl tinting dispersion[4] | 81.27 |
| NATROSOL ® Plus Grade 330[5] (0.8% by wt. aqueous dispersion) | 25.44 |
| Deionized water | 76.28 |

[1]Sodium lithium magnesium silicate thickener from Southern Clay Products, Gonzales, Texas.
[2]Diethylene glycol monobutyl ether solvent from Union Carbide Chemicals and Plastics Company, Inc., Danbury, Connecticut.
[3]Defoamer from Air Products and Chemicals, Inc., Allentown, Pennsylvania.
[4]A solvent-borne slurry of pearlescent mica.
[5]Hydroxyethylcellulose from Aqualon Company, Wilmington, Delaware.

The coating composition of Example A-2 was prepared in the following manner. In a mixing vessel under high speed agitation with a Cowles blade, the LAPONITE RD was sifted into the water. After 20 minutes, the additional water was added, the BENTONE EW was sifted into the vessel, and the high speed agitation with the Cowles blade continued for an additional 20 minutes. Following this mixing, the Cowles blade was replaced with a paddle blade, and the remaining materials were added slowly in sequence under moderate agitation, with 5 minutes of mixing between additions.

COATING EXAMPLE B-1

A pigmented base coat composition was made as follows, corresponding to Example A-1, but with the polyurethane/acrylic dispersion of the present invention.

| Ingredients | Parts by Weight |
| --- | --- |
| Aqueous urethane/acrylic polymer dispersion of Example 1 | 228.68 |
| BENTONE ® EW (1.9% by wt. aqueous dispersion) | 25.44 |
| NOPCO DSX ® 1550 (10% by wt. aqueous solution) | 13.98 |
| SURFYNOL ® 104DPM | 2.20 |
| Waterborne acrylic black tint | 7.60 |
| Waterborne acrylic blue tint | 76.87 |
| Deionized water | 35.48 |

The Butyl Cellosolve, polypropylene glycol, and butylbenzylphthalate, which were necessary for proper film coalescence in Example A-1, were not necessary in this example due to differences between the acrylic emulsion and the urethane/acrylic dispersion. The coating composition of Example B-1 was prepared in the following manner. In a mixing vessel under moderate agitation with a paddle blade, the materials were added slowly in sequence, with 5 minutes of mixing between additions. The black and blue tints were the same as in Example A-1.

COATING EXAMPLE B-2

A pearlescent intermediate coating composition was made as follows, corresponding to Example B-1, but with the polyurethane/acrylic dispersion of the present invention.

| Ingredients | Parts by Weight |
| --- | --- |
| Deionized water | 85.47 |
| LAPONITE ® RD | 0.85 |
| Deionized water | 62.14 |
| BENTONE ® EW | 2.05 |
| Aqueous urethane/acrylic polymer dispersion of Example 1 | 245.10 |
| NOPCO DSX ® 1550 (10% by wt. aqueous solution) | 50.80 |
| Amino methyl propanol (50% by wt. aqueous solution) | 0.97 |
| SURFYNOL ® DF210 | 0.19 |
| Pearl tinting dispersion | 81.27 |
| NATROSOL ® PLUS Grade 330 (0.8% by wt. aqueous dispersion) | 25.44 |
| Deionized water | 76.28 |

The butyl CELLOSOLVE, butyl CARBITOL, and butylbenzylphthalate, which were necessary for proper film coalescence in Example A-2, were not necessary in this example due to differences between the acrylic emulsion and the urethane/acrylic dispersion. The coating composition of Example B-2 was prepared in the following manner. In a mixing vessel under high speed agitation with a Cowles blade, the LAPONITE RD was sifted into the water. After 20 minutes, the additional water was added, the BENTONE EW was sifted into the vessel, and the high speed agitation with the Cowles blade continued for an additional 20 minutes. Following this mixing, the Cowles blade was replaced with a paddle blade, and the remaining materials were added slowly in sequence under moderate agitation, with 5 minutes of mixing between additions.

COATING EXAMPLES C-1 and C-2
(Comparative)

A basecoat C-1 and a pearlescent coat C-2 were made in essentially the same manner as coatings B1/B2, except the urethane resin differed from that of Example 1 in that the only polyisocyanate used was methylene dicyclohexyl diisocyanate.

Each of the coating formulations of Examples A-1, A-2, B-1, B-2, C-1, and C-2 was tested for performance by application onto a substrate prepared as follows. The substrates were 32 gauge steel panels precoated with electrocoat and primer (available from Advanced Coating Technologies, Inc., Hillsdale, Mich.; as APR24711 ), scuffed with 400 grit sandpaper (P400-213Q, IMPERIAL® WETORDRY® production paper, "A" weight, available from 3M, St. Paul, Minn.), wiped clean with "DX 330" degreaser (available from PPG Industries, Inc., Pittsburgh, Pa.), and sealed with "DP 40/DP 401/DT 870" (a sealer made by mixing 1 volume "DP 40" epoxy primer with 1 volume "DP 401" epoxy primer catalyst with ½ volume "DT 870" reducer, all available from PPG Industries, Inc.). The sealed substrates were air-dried under ambient conditions for at least 1 hour before the example coatings were applied.

Each of the base coat compositions of Example A-1, B-1, and C-1 was applied by air-atomized spray over the previously prepared substrates to achieve hiding. Each base coated substrate was air-dried under ambient conditions for at least 20 minutes. Then the pearlescent coatings of Examples A-2, B-2, and C-2 were applied over the dried base coats of Example A-1, B-1, and C-1 respectively. Each of the compositions of Examples A-2, B-2, and C-2 was applied by air-atomized spray. Each of the twice-coated substrates was again air-dried under ambient conditions for at least 20 minutes. Subsequently, the same clear top coating was spray applied to the dried pearlescent coatings on both substrates. The clear coating composition was made by mixing 4 volumes "DCU 2021" urethane clear coat with 1 volume "DCX 61" urethane hardener with 1 volume "DT 870" reducer, all available from PPG Industries, Inc.

Evaluation of adhesion, gloss, and DOI (distinctness of image) of the coated substrates as described above was performed following 168 hours of air-drying at ambient conditions, and was performed again following a subsequent exposure to either 96 hours at 100 degrees F and 100% relative humidity or 240 hours of immersion in water at 104° F. (40° C.). The adhesion, gloss, and DOI tests were performed no later than 5 minutes after removal of the panels from the humidity or water soak exposure. The results are set forth in Table I.

Adhesion testing was performed in accordance with the method set forth in ASTM D3359, Method B, whereby the coating was scribed with eleven parallel cuts through the film 2 millimeters apart, using a Gardner Cross Cut Tester Model P-A-T, fitted with a PA-2056 blade (both available from Gardco, Pompano Beach, Fla.). Eleven similar cuts were made at 90 degrees to and crossing the first eleven cuts. Permacel 99 tape was applied over the area of cuts by pressing down firmly against the coating to eliminate voids and air pockets. Then the tape was sharply pulled off at a 180 degree angle to the plane of the coated surface. Adhesion was reported as the percentage of squares remaining on the substrate in the scribed area. Thus, a result of 100% indicates no loss of adhesion, and 0% indicates total failure of adhesion.

Gloss measurements of each coated panel were made using a Gardner Glossgard IIa 20 degree glossmeter (available from Pacific Scientific, a Gardner/Neotec Instrument Division, Silver Spring, Md). Results are in terms of percentage of light reflected, whereby a higher number indicates higher gloss.

DOI measurements of each coated panel were made using a DOI "C-box" (available from I²R Company, Cheltenham, Pa.).

TABLE I

| EXAMPLE: | A-1 + A-2 (Comparative) | B-1 + B-2 (Invention) | C-1 + C-2 (Comparative) |
|---|---|---|---|
| ADHESION | | | |
| Initial | 100% | 100% | 100% |
| After humidity | 0% | 100% | 100% |
| After water soak | 0% | 100% | 0 |
| GLOSS | | | |
| Initial | 90 | 91 | 86 |
| After humidity | 76 | 85 | 62 |
| After water soak | 77 | 80 | 38 |
| DOI | | | |
| Initial | 70 | 80 | 60 |
| After humidity | 30 | 60 | 0 |
| After water soak | 20 | 45 | 0 |

Examples 2 through 6 describe components that were used to make the coating composition of Example D, a preferred embodiment employing the polyurethane/acrylate dispersion of the present invention.

EXAMPLE 2

Although not required by the present invention, the embodiment of Example D includes, for additional property enhancements, an additive component comprising a cellulose acetate butyrate/acrylic dispersion, the preparation of which is described in this example. This material is the subject matter of now co-pending, commonly owned U.S. patent application Ser. No. 08/669,815, filed Jun. 27, 1996, titled "Stable Aqueous Dispersions of Cellulose Esters, Methods of Making and Their Use in Coatings" filed on even date herewith by Suryya K. Das et al.

A pre-emulsion of cellulose acetate butyrate and acrylic monomer mixture was prepared by dissolving 158.0 grams of cellulose acetate butyrate (CAB-551-0.01, available from Eastman Chemical Co., USA) in 577.8 grams of n-butyl acrylate by stirring at room temperature. Acrylic monomers (22.1 grams of 2-hydroxyethyl methacrylate, 18.9 grams of ethylene glycol dimethacrylate and 12.6 grams of acrylic acid) were added and the mixture was agitated for about 20 minutes before adding 14.8 grams of ALIPAL CO-436 anionic surfactant (ammonium salt of ethoxylated nonylphenol sulfate, from Rhone-Poulenc). After mixing for 10 minutes, 1000.0 grams of deionized water and 3 drops of FOAMKILL 649 defoamer (from Crucible Chemicals, Greenville, S.C.) were added and stirred for about 5 minutes for pre-emulsification.

The pre-emulsion was passed once through a M110T Microfluidizer® emulsifier at 8000 psi to produce a micro-dispersion. While stirring the microdispersion at room temperature in a round bottom flask, a mixture of 1.34 grams of 1 percent aqueous solution of ferrous ammonium sulfate and 16.6 grams of deionized water was added the mixture, and the mixture was then heated to 40° C. under nitrogen. A solution of 2.6 grams of isoascorbic acid in 33.4 grams of deionized water was added rapidly and followed by the addition of the following solution over 10 minutes:

| Ingredients | Grams |
|---|---|
| ALIPAL CO-436 | 7.4 |
| Deionized water | 154.6 |
| Tert-butylhydroperoxide (70 percent active in water) | 3.6 |

The temperature rose spontaneously to 92° C. The product was filtered to yield a latex with a resin content of 38.9 percent determined at 110° C. for one hour and a pH of 2.79. The pH of the latex was adjusted to 8.33 using 11.0 grams of N,N-dimethylethanolamine as a neutralizing agent.

EXAMPLE 3

A blue pigment paste for use in Example D was prepared by mixing together under agitation in a suitable container the following materials:

| Ingredients | Grams |
|---|---|
| 1-Methoxy-2-propanol | 66.85 |
| Deionized water | 144.08 |
| Acrylic polymer[1] | 374.60 |
| NIAX Polyol[2] | 35.73 |
| Dimethyl ethanolamine, 50% in deionized water | 8.64 |
| Heliogen Blue pigment[3] | 97.40 |
| The following pre-mixed components were added to above mixture: | |
| Polyurethane acrylic latex[4] | 39.09 |
| Deionized water | 107.07 |

[1] 35% butyl acrylate, 30% styrene, 18% butyl methacrylate, 8.5% 2-hydroxyethyl acrylate, 8.5% acrylic acid; at 27% total solids dispersed in a mixture of deionized water and diethylene glycol monobutyl ether.
[2] Commercially available from Union Carbide Chemicals and Plastics Co., Inc. as PPG-425.
[3] Commercially available from BASF Corporation.
[4] Prepared according to U.S. Pat. No. 5,071,904, Example I.

EXAMPLE 4

A red pigment paste was prepared by mixing together under agitation in a suitable container the following materials:

| Ingredients | Grams |
|---|---|
| 1-Methoxy-2-propanol | 15.52 |
| Deionized water | 38.80 |
| Acrylic polymer[1] | 408.87 |
| NIAX Polyol[2] | 29.67 |
| Dimethyl ethanolamine, 50% in deionized water | 5.71 |
| Red pigment[3] | 78.04 |
| Deionized water | 29.72 |

[1] 35% butyl acrylate, 30% styrene, 18% butyl methacrylate, 8.5% 2-hydroxyethyl acrylate, 8.5% acrylic acid; at 27% total solids dispersed in a mixture of deionized water and diethylene glycol monobutyl ether.
[2] Commercially available from Union Carbide Chemicals and Plastics Co., Inc. as PPG-425.
[3] Commercially available from Ciba-Geigy Corp. as YRT-759-D.

EXAMPLE 5

A black pigment paste was prepared by mixing together under agitation in a suitable container the following materials:

| Ingredients | Grams |
|---|---|
| 1-Methoxy-2-propanol | 52.76 |
| n-Propoxy propanol | 52.76 |
| Deionized water | 97.66 |
| Acrylic polymer[1] | 585.89 |
| Dimethyl ethanolamine, 50% in deionized water | 13.30 |
| Carbon black pigment[2] | 54.05 |

[1] 35% butyl acrylate, 30% styrene, 18% butyl methacrylate, 8.5% 2-hydroxyethyl acrylate, 8.5% acrylic acid; at 27% total solids dispersed in a mixture of deionized water and diethylene glycol monobutyl ether.
[2] Commercially available from Cabot Corporation.

EXAMPLE 6

A black mica and aluminum pigment paste was prepared by mixing together in a suitable container the following materials:

| Ingredients | Grams |
| --- | --- |
| Ethylene glycol monohexyl ether | 13.9 |
| N-methyl pyrrolidone | 13.9 |
| TINUVIN 1130 | 5.8 |
| Mica pigment[1] | 4.4 |
| CYMEL 385[2] | 12.4 |
| RESIMENE 750[3] | 12.4 |
| Aluminum pigment[4] | 0.83 |
| Phosphatized epoxy[5] | 0.73 |
| Blue pigment paste of Example 3 | 6.5 |
| Red pigment paste of Example 4 | 11.6 |
| Dimethyl ethanolamine, 50% in deionized water | 17.5 |
| Deionized water | 112.3 |
| Mineral spirits | 16.0 |
| Oligomeric ester[6] | 24.7 |

[1]Commercially available from The Mearle Corp. as 9225 EWT-1
[2]Melamine formaldehyde resin commercially available from CYTEC Industries, Inc.
[3]Melamine formaldehyde resin commercially available from Monsanto Chemical Co.
[4]Chromium treated aluminum pigment at 65% solids in 15% water, 5% ethylene glycol monobutyl ether, 5% naphtha, and 10% mineral spirits, available from Obron Atlantic Corporation under the trademark Stapa Hydrolux 400.
[5]Reaction product of 83 parts EPON 828 (diglycidyl ether of Bisphenol A available from Shell Oil and Chemical Co.) and 17 parts phosphoric acid at 55 percent weight solids.
[6]Prepared according to U.S. Pat. No. 4,927,868, Example B, from methylhexahydrophthalic anhydride and 1-(3-hydroxy-2,2-dimethylpropyl)3-hydroxy-2,2-dimethylpropionate.

COATING EXAMPLE D

A coating composition suitable for automotive applications was prepared by combining together under agitation in a suitable container the following ingredients:

| Ingredients | Grams |
| --- | --- |
| Polyurethane/acrylate dispersion of Example 1 | 201.3 |
| CAB dispersion of Example 2 | 180.1 |
| Black pigment paste of Example 5 | 65.9 |
| Pigment paste of Example 6 | 252.96 |

The coating composition had a solids content of 21 percent by weight and a pH of 8.8, and was adjusted to a spray viscosity of 24 seconds #4 Ford Cup with deionized water.

The pigmented aqueous coating composition of Example D was evaluated for use as a basecoat composition on cold rolled steel test panels treated with BONDERITE 40, commercially available from Advanced Coating Technology Company, and electrocoated with cationic electrocoat primer commercially available from PPG, Industries, Inc. as ED 5000. The base coats were spray applied onto the test panels with the spray booth at 60 percent relative humidity then baked for 5 minutes at 200° F. (93° C.). A solvent borne, two component, isocyanate clear coat composition commercially available from BASF Corporation was then spray applied over the base coats on the test panels and baked for 30 minutes at 293° F. (145° C.). The resultant dry film thickness of the basecoat was 0.5 to 0.7 mils (13 to 18μ), and of the clear coat was about 1.6 to 1.8 mils (40 to 46μ).

The cured films were evaluated for humidity resistance as above and where found to have good humidity resistance properties. The cured films of this example were also tested for resistance to chipping due to stone impact, and were found to have excellent resistance. Therefore, this composition is highly recommended for use in automotive coating applications.

Although certain embodiments of the invention have been described in detail for the purpose of illustrating the best mode of the invention, it is to be understood that such detail is solely for that purpose and that variations can be made by those skilled in the art without departing from the spirit and scope of the invention as defined by the claims.

We claim:

1. A water reducible chain extended polyurethane-acrylic resin which comprises:

(a) 50–90 percent by weight of a polyurethane that is substantially free of silane groups which is the reaction product of:

(i) a first polyisocyanate having an open carbon chain greater than $C_6$ in length between two isocyanate groups;

(ii) a second polyisocyanate different from the first polyisocyanate;

(iii) polyol; and (iv) a monomer having an anionic group and functionality reactive with isocyanate, wherein the first polyisocyanate is present in a minor portion of the polyisocyanate mixture, and;

wherein the reaction product of (i), (ii), (iii) and (iv) gives an isocyanate-terminated polyurethane prepolymer; and (v) chain extender selected from the group consisting of amino alcohol, primary or secondary amines; and (b) 10–50 percent by weight of the free radical polymerization product of a mixture of vinyl monomers which have 0–50 weight percent styrene or substituted styrene based on total resin solids weight of the vinyl monomer reactants; and where the weight percentages of (a) and (b) are based on the total resin solids content of (a) plus (b).

2. The resin of claim 1 wherein the polyurethane (a) is the reaction product of:

(i) 8–25 percent by weight of said first polyisocyanate;
   (ii) 15–50 percent by weight of said second isocyanate;
   (iii) 25–70 percent by weight of said polyol; and
   (iv) 1–10 percent by weight of said monomer having an anionic group and functionality reactive with isocyanate;

the weight percentages based on total resin solids weight of the polyurethane reactants.

3. The resin of claim 1 wherein the polyurethane (a) is the reaction product of:

(i) 10–20 percent by weight of said first polyisocyanate;
   (ii) 20–40 percent by weight of said second isocyanate;
   (iii) 40–60 percent by weight of said polyol; and
   (iv) 5–10 percent by weight of said monomer having an anionic group and functionality reactive with isocyanate;

the weight percentages based on total resin solids weight of the polyurethane reactants.

4. The resin of claim 1 wherein the free radical polymerization product (b) is the reaction product of the 0–50weight percent styrene or substituted styrene and 50–100 weight percent esters of acrylic acid or methacrylic acid where the weight percentages are based on total solids weight of the vinyl monomer reactants.

5. The resin of claim 4 where the vinyl monomers include methyl methacrylate and another acrylate.

6. The resin of claim 4 where the vinyl monomers include less than weight percent styrene or substituted styrene.

7. The resin of claim 1 where said first polyisocyanate has the structure

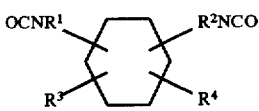

where $R^1$ $R^2$ $R^3$ and $R^4$ may be the same or different, $R^1$ and $R^2$ each contain alkylene groups greater than $C_6$ in length, and $R^3$ and $R^4$ each are H or an alkyl group.

8. The resin of claim 7 wherein $R^1$ and $R^2$ each contain alkylene groups at least $C_8$ in length, and $R^3$ and $R^4$ each include an alkyl group.

9. In a method for making an aqueous polyurethane-vinyl polymer dispersion comprising:
 (a) forming a carboxy-containing, water-dispersible, polyurethane prepolymer from:
  (i) a first polyisocyanate having an open carbon chain greater than $C_6$ in length between two isocyanate groups;
  (ii) a second polyisocyanate different from the first polyisocyanate;
  (iii) a polyol; and
  (iv) a monomer having an anionic group and functionality reactive with isocyanate, wherein the first polyisocyanate is present in a minor portion of the polyisocyanate mixture;
 (b) adding a vinyl monomer composition to the prepolymer to form a prepolymer/monomer mixture,
 (c) adding a tertiary amine to the prepolymer/monomer mixture in an amount sufficient to render the prepolymer water dispersible,
 (d) dispersing the prepolymer/monomer mixture in water,
 (e) adding a free radical initiator and a chain-extender to the aqueous dispersion, and
 (f) polymerizing the vinyl monomer and effecting chain extension of the polyurethane by heating the aqueous dispersion, whereby the polyurethane that is substantially free of silane groups is present in an amount of at least 50 percent by weight of the polymerized vinyl monomer and polyurethane.

10. The method of claim 9 wherein the step of forming a polyurethane prepolymer comprises the steps of reacting
 (i) 8–25 percent by weight of said first polyisocyanate;
 (ii) 15–50 percent by weight of said second isocyanate;
 (iii) 25–70 percent by weight of said polyol; and
 (iv) 1–10 percent by weight of said monomer having an anionic group and functionality reactive with isocyanate;
the weight percentages based on total resin solids weight of the polyurethane reactants.

11. The method of claim 10 wherein the step of forming a polyurethane prepolymer comprises utilizing as said first polyisocyanate a compound having the structure

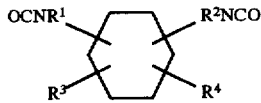

where $R^1$ $R^2$ $R^3$ and $R^4$ may the same or different, $R^1$ and $R^2$ each contain alkylene groups greater than $C_6$ in length, and $R^3$ and $R^4$ each are H or an alkyl group.

12. The method of claim 11 wherein $R^1$ and $R^2$ each contain alkylene groups at least $C_8$ in length, and $R^3$ and $R^4$ each comprise an alkyl group.

13. An aqueous coating composition comprising:
water;
pigment; and
a water reducible chain extended polyurethane-acrylic resin which comprises:
 (a) 50–90 percent by weight of a polyurethane that is substantially free of silane groups which is the reaction product of:
  (i) a first polyisocyanate having an open carbon chain greater than $C_6$ in length between two isocyanate groups;
  (ii) a second isocyanate different from the first polyisocyanate;
  (iii) a polyol; and
  (iv) a monomer having an anionic group and functionality reactive with isocyanate, wherein the first polyisocyanate is present in a minor portion of the polyisocyanate mixture; and
 wherein the reaction product of (i), (ii), (iii) and (iv) gives an isocyanate-terminated polyurethane prepolymer;
  (v) chain extender selected from the group consisting of amino alcohol, primary or secondary amines; and
 (b) 10–50 percent by weight of the free radical polymerization product of a mixture of vinyl monomers which have 0–50 weight percent styrene or substituted styrene based on total resin solids weight of the vinyl monomer reactants; and where the weight percentages of (a) and (b) are based on the total resin solids content of (a) plus (b).

14. The coating composition of claim 13 wherein the polyurethane (a) is the reaction product of:
 (i) 8–25 percent by weight of said first polyisocyanate;
 (ii) 15–50 percent by weight of said second isocyanate;
 (iii) 25–70 percent by weight of said polyol; and
 (iv) 1–10 percent by weight of said monomer having an anionic group and functionality reactive with isocyanate;
the weight percentages based on total resin solids weight of the polyurethane reactants.

15. The coating composition of claim 13 wherein the polyurethane (a) is the reaction product of:
 (i) 10–20 percent by weight of said first polyisocyanate;
 (ii) 20–40 percent by weight of said second isocyanate;
 (iii) 40–60 percent by weight of said polyol; and
 (iv) 5–10 percent by weight of said monomer having an anionic group and functionality reactive with isocyanate;
the weight percentages based on total resin solids weight of the polyurethane reactants.

16. The coating composition of claim 13 wherein the free radical polymerization product (b) is the reaction product of the 0–50 weight percent styrene or substituted styrene and
 50–100 weight percent esters of acrylic acid or methacrylic acid where
 the weight percentages are based on total resin solids weight of the vinyl monomer reactants.

17. The coating composition of claim 16 where the vinyl monomers include methyl methacrylate and another acrylate.

18. The coating composition of claim 16 where the vinyl monomers include less than 30 weight percent styrene or substituted styrene.

19. The coating composition of claim 13 where said first polyisocyanate has the structure

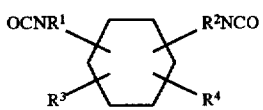

where $R^1$, $R^2$, $R^3$, and $R^4$ may be the same or different, $R^1$ and $R^2$ each contain alkylene groups greater than $C_6$ in length, and $R^3$ and $R^4$ each are H or an alkyl group.

20. The coating composition of claim 19 wherein $R^1$ and $R^2$ each contain alkylene groups at least $C_8$ in length, and $R^3$ and $R^4$ each include an alkyl group.

21. The coating composition of claim 13 further including a cross-linking agent.

22. The coating composition if claim 21 wherein the cross-linking agent is a melamine derivative.

23. The resin of claim 1 wherein the amount of chain extender is approximately equivalent to the free isocyanate groups in the prepolymer and the ratio of active hydrogens in the chain extender to isocyanate groups in the prepolymer is in the range from 0.7 to 1.3:1.

* * * * *

UNITED STATES PATENT AND TRADEMARK OFFICE
CERTIFICATE OF CORRECTION

PATENT NO. : 5,739,194
DATED : April 14, 1998
INVENTOR(S) : Natesh et al.

It is certified that error appears in the above-identified patent and that said Letters Patent are hereby corrected as shown below:

Please amend the following claims in the below-indicated manner:

Claim 4, column 14, line 61, after the word "total", please insert the word --resin--;

Claim 8, column 15, line 7, after the word "where", please separate the substituent groups by inserting a comma (,) as follows: --$R^1$, $R^2$, $R^3$, and $R^4$--.

Claim 11, column 15, line 61, after the word "where", please separate the substituent groups by inserting a comma (,) as follows: --$R^1$, $R^2$, $R^3$, and $R^4$--.

Claim 13, column 16, line 21, after the word "prepolymer;" please insert the word --and--.

Signed and Sealed this

First Day of May, 2001

*Attest:*

NICHOLAS P. GODICI

*Attesting Officer*     Acting Director of the United States Patent and Trademark Office